UNITED STATES PATENT OFFICE.

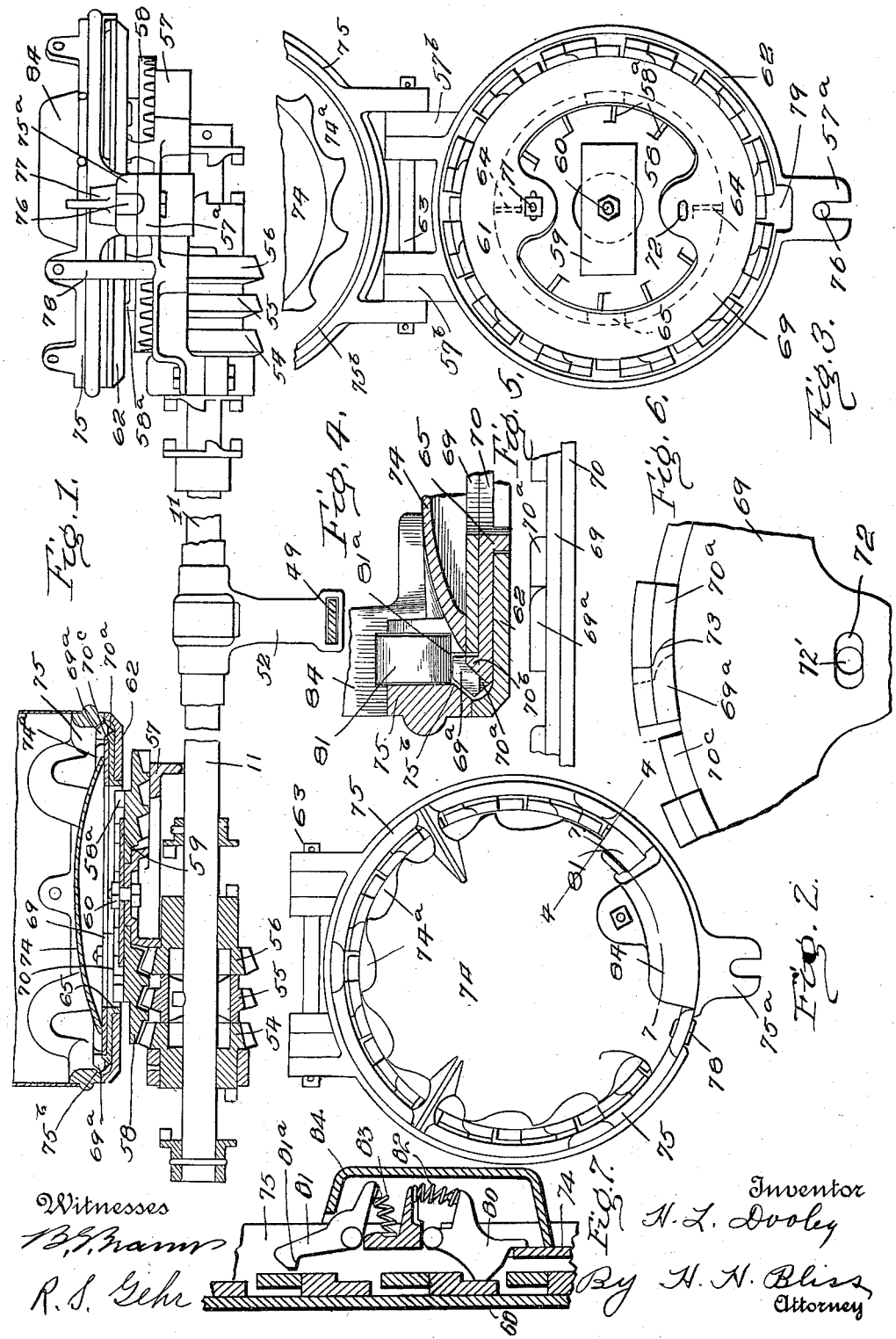
H. L. DOOLEY.
SEEDER OR DROPPING MECHANISM FOR PLANTERS.
APPLICATION FILED MAR. 24, 1910.
1,149,118.
Patented Aug. 3, 1915.

HARRY L. DOOLEY, OF ROCK ISLAND, ILLINOIS.

SEEDER OR DROPPING MECHANISM FOR PLANTERS.

1,149,118.  Specification of Letters Patent.  Patented Aug. 3, 1915.

Application filed March 24, 1910. Serial No. 551,231.

*To all whom it may concern:*

Be it known that I, HARRY L. DOOLEY, a citizen of the United States, residing at Rock Island, in the county of Rock Island and State of Illinois, have invented certain new and useful Improvements in Seeders or Dropping Mechanism for Planters, of which the following is a specification, reference being had therein to the accompanying drawing.

This invention relates to improvements in seed separating mechanisms for planters and has more particularly to do with corn planters of the check row type. My invention is not limited, however, to use with planters of this type and my improved construction is equally adapted for use with machines of other classes.

In the accompanying drawings forming a part of this specification I have illustrated my improvements in connection with certain other corn planter parts which are more fully shown and described in my copending application for improvements in planters filed March 24th, 1910, Serial Number 551,232.

Of the drawings: Figure 1 is a fragmentary detailed view of the mechanism at the bottom of the hoppers of a two row corn planter, that of the right hopper being shown in rear elevation, while that of the left hopper is shown in vertical section. Fig. 2 is a plan view of the seeding mechanism at the bottom of one of the hoppers. Fig. 3 is a plan view of one of the same mechanisms, showing the stationary bottom plate of the hopper thrown back to uncover the seed plate. Fig. 4 is a fragmentary sectional view taken on the line 4—4 of Fig. 2. Fig. 5 is a detailed view showing in elevation the inner side of a fragment of the seed plate. Fig. 6 is a plan view of a portion of the seed plate, the adjustability of one section of the plate relative to the other being indicated by dotted lines. Fig. 7 is a detailed sectional view taken on the line 7—7 of Fig. 2, showing the cut off and knockout devices which coöperate with the seed plates.

Each of the hoppers and seed separating mechanisms is mounted upon a frame structure 57, which in turn may be connected with the forward transverse planter or runner frame. Rotatably secured upon this part 57, and held in place by a plate 59 is a bevel gear plate 58, upon which are provided, preferably three, concentric series of gear teeth. Each of the gear plates 58 serves to drive the seed separating mechanism above it in a manner which will be fully set forth hereinafter.

For driving the gear plates I have shown a mechanism which is fully described in my co-pending application before referred to. This mechanism forms no part of my present invention and a detailed description will not, therefore, be necessary. It is sufficient to say that it consists of a transverse rotatable shaft 11, upon which, near each end, are mounted three bevel gears 54, 55 and 56, each of which is adapted to mesh with one of the series of bevel gear teeth of the plate 58. By longitudinally moving the shaft 11, by means of the parts indicated at 49 and 52 any pair of the pinions 54, 55 or 56 may be operatively connected with the shaft and may serve to transmit power from the shaft to the plates.

The shaft 11 may be so connected with the main driving wheels of the planter that it is given a half revolution corresponding to each engagement of a check row mechanism with a check wire tappet. It will be observed that on account of the different diameters of the rows of teeth on the gear plates 58, they will be rotated through different angles in accordance with which pinion is in operative engagement with the shaft 11. In this way, as will be more particularly set forth hereinafter, the number of seed kernels deposited in each hill may be varied.

Each gear plate 58 is provided with a series of upstanding lugs 58$^a$. Above the gear 58 is disposed the seed plate which is designated as an entirety by 61. The seed plate is rotatably mounted upon a bearing ring 62 which is hinged at its front side by means of the pin 63 to the hopper base or supporting casting 57. The lower side of the seed plate is formed with two diametrically opposite depending lugs 64 which are designed to engage the upstanding lugs 58$^a$ of the gear 58 so that the seed plate is driven by said gear. The lugs 64, together with other depending lugs 65, serve also to center the seed plate and maintain it in proper operative relation to the other parts.

The seed plate, which I have designated as an entirety by 61, consists of two annular parts 69 and 70, the former resting upon the latter as is clearly shown in Figs. 1 and 4. The two parts 69 and 70 are securely clamped together by bolts 71, which extend through slots 72 and holes 72' in the plate parts 69 and 70, the object of these slots being to permit a relative circumferential adjustment of the parts 69 and 70. The plate part 69 is formed at its outer edges with a series of lugs or teeth 69ª, which have horizontal top surfaces and beveled or inclined sides as is best shown in Fig. 4. Adjacent these teeth 69ª are similar teeth 70ª, the adjacent ends of the teeth 69ª and 70ª being formed to fit each other as indicated at 73 in Fig. 6. Adjacent each of the teeth 70ª the plate part 70 is formed with an upward extension 70ᵇ which rises only to the upper surfaces of the plate part 69 and these extensions and the plate part 70 proper are formed with a beveled surface 70ᶜ which lies preferably at an angle of 45° to the horizontal. Each of the spaces between the teeth 70ª and 69ª constitutes an individual seed cell and as this space is somewhat greater than the circumferential length of the lug or extension 70ᵇ, the length of the seed cell may be varied by adjusting the plate part 69 on the part 70, provision thus being made for seeds of different lengths.

Disposed above the seed plate is the crowned bottom plate 74 of the hopper, said plate being carried by and preferably cast integral with, the ring 75 which is journaled on the pin 63 and is provided with a slotted lug 75ª designed to rest upon a similar lug 57ª of the supporting casting 57. A swinging bolt 76 having a winged nut 77 serves to clamp the ring part 75 upon the casting 57.

78 is a spring catch mounted on the ring 75 and designed to engage a lug on the seed plate supporting ring 62 to detachably connect the ring 75 and the seed supporting ring 62. The inner, lower edge of the ring 75 is beveled or inclined at 75ᵇ so as to form a surface over-lying the adjacent inclined sides of the seed plate teeth 69ª and 70ª and so as to form the upper and outer sides of the seed cells. At its rear side the seed plate supporting ring 62 and the casting 57 beneath it are formed with a discharge opening 79, through which the seeds pass to the dropping mechanism. Above and to one side of the opening 79 are mounted the knock-out 80 and the cut off 81 respectively. The knock out 80 is in the form of a pivoted dog adapted to ride over the upper faces of the seed plate teeth and to be forced down between said teeth by a coil spring 82 as the seed plate moves one seed cell after another under the knock out. The cut off 81 is also in the form of a pivoted dog. The free end of the cut off has a horizontal lower edge 81ª which at one end rests upon the hopper bottom 74 and closely overlies the upper horizontal faces of the seed plate teeth 69ª, 70ª. In this position the cut off is held yieldingly by a coil spring 83.

84 is a housing which incloses the knock out and the greater part of the cut off. The hopper bottom 74, as previously stated, is crowned, i. e. slopes downward from its center toward its edge. And at its periphery this plate is formed with peculiar curved serrations 74ª (see Fig. 2), and this serrated edge is beveled off somewhat. The sloping sides of the plate 74 and the beveled or rounded inner side of the ring 75 form a sort of annular channel at the bottom of the hopper into which the seeds tend to move under the action of gravity. It will be observed that the inner wall of the ring 75 overlies the seed cells. In this way the seeds in the cells are in a large part protected from the disturbing action of the superposed seeds in the seed channel. At the bottom of this channel are the upstanding parts of the teeth 69ª of the seed plate and they serve to agitate the seeds at the bottom of the mass as the plate turns. Thus as the seeds find their way down over the outer edge of the hopper bottom 74, they come into the range of action of the seed plate teeth and, under the combined action of the said teeth and the outwardly curved serrations of plate 74, the seeds move gradually forward and outward toward the seed cells into which they slide edgewise. The entrance of the seeds into the cells is greatly facilitated because the cells are inclined, or, in other words, extend downward and outward in the general direction in which the seeds move in the annular channel at the bottom of the hopper. As a cell containing a seed or kernel of corn approaches and moves under the cut off 81, any superposed seed or seeds tending to find entrance to the same cell are separated by the cut off so that the single seed passes under and is discharged by the knock out into the passage 79. It will be observed that the teeth 69ª and 70ª which form the end walls of the cells extend upward above the main surface of the plate, openings being thus provided in the inner upper edges of the cells below the tops thereof through which the seeds can enter. These side openings greatly facilitate the entrance of seeds into the cells.

I have carefully explained the formation of the seed cells, pointing out that the inclined bottom walls 70ᶜ thereof are inclined to the plane of the seed plate, being preferably disposed at an angle of about 45°, and also that the active edge of the cut off is disposed horizontally above said cells as they pass thereunder. By reason of this inclination of the cell walls relative to the edge or face of the cut off, the seeds or kernels of comparatively widely varying widths are accurately separated and individually discharged, for it is clear that with two kernels, lying on their sides at an angle of 45°, or indeed at any angle less than 90°, and of different widths, the difference in the clearance between the upper edges of said kernels and the horizontal working edge of the cut off is less than the difference in the actual width of the kernels. In other words, a relatively small clearance between the cut off and the upper edge of the narrowest seed that will be individually separated and discharged with unfailing accuracy, permits such an accurate separation and discharge of a much wider seed or kernel, that would be possible if the walls of the seed cell and the edge of the cut off were at right angles to each other. This wide variability in width of seed that can be accurately separated, combined with the longitudinal (circumferential) adjustment of the seed cell, gives my improved seed plate mechanism a very wide range in its adaptability to the planting of seeds of varying kinds and sizes, for it is well understood that it is the width and length of the corn seed or kernel that are subject to the greatest variation, the variation of the third dimension, i. e. the thickness of the kernel, being relatively very small. It is clear that my improved seed plate with the inclined cells takes advantage of this characteristic of the corn seed.

It will be noted that I have shown a seed plate having twelve cells. This number, of course, can be varied, but the pinions 54, 55 and 56 and the gear plate 58 must be so designed in relation to the seed plate that when one of the pinions is in operation, as for instance, 56, the seed plate will be moved at each actuation of the shaft 11 to an angle such as to cause, say four kernels to be deposited. When the pinion 55 is in operation, three kernels may be deposited, and when the pinion 54 is in operation, two kernels may be deposited.

The action of a seed plate having the essential features of the plate herein described is materially different from that of one of either of the main classes of those heretofore used. The cells in each plate of one class have usually had relatively large apertures between the periphery and the center, and entirely surrounded by metal, the parts being intended and designed for the reception of two, three, or more kernels, flatwise. The kernels did not enter the cells in any predetermined position in relation to the plate. In each plate of the other class the cells were formed at the periphery with the design and intention of having the corn kernel before entering the cell turned upward from an edgewise horizontal into an edgewise vertical position. After entering, it was carried around while standing at 90° to the horizontal, sliding or riding upon one of its edges on the stationary metal below the bottom of the cell. With plates of the latter class, it has been found that the impedance to the kernels getting into this perpendicular position has greatly enhanced the inaccuracy in the delivery of the number predetermined for planting. The cells, to a large percentage, are carried around empty. One of the principal causes for this is the fact that if a kernel in a horizontal position reaches the cell mouth, it does not (when considered even by itself) easily take the upright position and drop edgewise into the vertical cell; and this difficulty is greatly increased by the neighboring kernels and especially those above it which tend to hold it flatwise horizontally and interfere with its readily turning upward 90° to permit the vertical drop.

One of the purposes of the present construction is to provide a cell into which the kernels shall separately slide or settle without requiring their turning to, and standing at, 90° to the horizontal. The squeezing from the weight of the mass above each kernel assists in its outward travel into the cell at 45°, or thereabout. The conformation of the upper surface of the cap plate 74 at the bottom of the hopper is such that radial lines along this surface approximately coincide with the radial lines of the top surface of the inclined bottoms of the cell. Consequently, the outward movement under the squeezing action of the mass, enhanced by the agitation of the stirring devices, causes the seeds to easily slide outward until they come to their place of rest in the cell, their inner edges at no time being required to rise beyond the 45° inclination. As soon as the kernel has entered its cell, the neighboring wall of the hopper bottom serves as a cut-off to prevent interference with the kernel therein from those which are adjacent.

What I claim is—

1. In a planter seed separating mechanism, the combination of a rotatable seed plate having a circular series of seed receiving cells each with an inner flat wall tangent to a circle of rotation, a stationary annular wall adjacent the cells of the plate and parallel to the inner flat walls thereof, inclosed spaces being thus formed each of which is capable of receiving only a single corn kernel in an edgewise manner and of holding it with its axis horizontal and with its flat faces in definite positions angularly with respect to the horizontal, and a cut-off having its active face disposed approximately at an angle of 45° to the planes of the stationary annular wall and of the inner walls of the notches.

2. In a planter seed separating mechanism, the combination of a rotatable seed plate having a circular series of seed receiving cells each with an inner flat wall tangent to a circle of rotation and at an angle of approximately 45° to the horizontal, a stationary annular wall adjacent the cells of the plate and parallel to the inner inclined walls thereof, inclosed spaces being thus formed each of which is capable of receiving only a single corn kernel in an edgewise manner and of holding it with its axis horizontal and with its flat faces at an angle of approximately 45° to the horizontal, and a cut-off having its active face disposed approximately horizontally, substantially as set forth.

3. In a planter, a seed separating mechanism comprising a seed plate having a circumferential series of individual seed cells with their seed supporting side walls inclined to the plane of rotation of the plate, up-standing teeth between the cells having their upper surfaces above the entrances to the cells and parallel to the plane of rotation of the seed plate, and a cut-off having its active edge lying parallel and closely adjacent the upper surfaces of the teeth.

4. In a planter, a seed separating mechanism comprising a hopper base, a rotary seed plate having a circumferential series of radially extending teeth, the outer edge or surface of the plate between the said teeth being inclined to the plane of rotation of the plate and the adjacent wall of the hopper base being parallel to said inclined surface, whereby there is formed a circumferential series of individual seed cells having their side walls inclined to the plane of rotation of the plate, and a cut-off having its active face or edge disposed parallel to the said plane of rotation.

5. In a planter, a seed separating plate having a series of circumferential seed cells, each adapted to hold a single seed in edgewise position with its axis perpendicular to a radius of the plate and each having a wall adapted to engage with and support one of the wider faces of a seed, the said plate comprising means for adjusting the length of the cells.

6. In a planter, a seed separating plate having a series of circumferential seed cells, each adapted to hold a single seed in edgewise position with its axis perpendicular to a radius of the plate and each having a wall adapted to engage with and support one of the wider faces of a seed, the said plate comprising means for adjusting the length of the cells, in combination with means lying closely adjacent to each cell and adapted to engage the other wider face of the seed and hold the seed in the cell.

7. In a planter, a seed separating plate having a series of circumferential seed cells, each adapted to hold a single seed in edgewise position with its axis perpendicular to a radius of the plate and each having a wall adapted to engage with and support one of the wider faces of a seed, the said plate comprising means for adjusting the length of the cells, in combination with a stationary annular wall lying closely adjacent to each cell and adapted to engage the other wide face of the seed and hold the seed in the cell.

8. A seed separating plate for planters comprising a disk provided with equally spaced radial teeth, a second disk provided with equally spaced radial teeth arranged alternately with respect to the teeth of the first disk and circumferentially overlapping them respectively, one of the plates having cell forming walls adjacent respectively to its teeth and extending circumferentially, each wall being adapted to engage one of the wider faces of a seed, a stationary annular wall adjacent the outer surfaces of the teeth and parallel to the said cell forming walls and adapted to engage the other faces of the seeds to hold them in the cells, and means whereby the two plates may be relatively adjusted angularly to vary the length of the cells.

9. In a seed planter, a rotary horizontal seed plate having peripheral seed cells open at their upper inner edges and each capable of holding a single seed only, each of said cells having an inclined bottom surface which is inclined downward and outward from the axis of the plate, in combination with a stationary wall adjacent to the cell and having an inclined surface above and closely adjacent the kernel.

10. In a seed planter, a horizontal rotary plate having peripheral seed cells open at their upper inner edges and each adapted to receive and carry a single kernel, in combination with a stationary wall adjacent to the edges of the plate, the seed plate and the wall each having downward and outward inclined surfaces one adjacent to the bottom flat surface and the other adjacent to the top flat surface of the kernel.

11. In a planter, a horizontal rotatable seed plate having seed cells each formed with a surface inclined to the horizontal and adapted to contact with the wider face of a seed lying above it and support it, in combination with means for holding the seed in an inclined position, and agitating devices immediately adjacent to the said cells and positioned above the main surface of the plate for agitating the kernels in the mass immediately above them.

12. In a planter, a seeder plate having peripheral cells each formed with a bottom wall inclined to the horizontal, in combination with a stationary wall having an inclined face immediately adjacent to the cells.

13. For a planter, a seeder plate having a downward and outward inclined peripheral wall and a series of teeth projecting outward and upward from the said peripheral wall, cells being formed between each pair of adjacent teeth, each adapted to retain only a single seed with one of its wider faces supported on the said peripheral wall, and each of the said teeth comprising two parts which are circumferentially adjustable relatively to each other.

14. The combination with the rotatable seed plate having cells and projections adjacent to the cells and extending upward above the body of the plate, of channel-forming parts above the cells providing an upwardly widening channel and including walls inclined to the path of the cells against which walls the kernels can impinge when in contact with the said projections.

15. For a planter, a rotatable seeder plate having a series of inclined seed supports holding the seeds in inclined positions, in combination with an overhanging stationary wall lying closely adjacent to and partially covering the seeds while they are so held.

16. In a planter, a seed plate provided with a series of seed cells each having a downward and outward inclined seed supporting wall and end walls extending vertically above the upper inner edge of the said inclined wall, an opening in the side of the cell being thus provided between the top of the cell and the said wall, in combination with a stationary annular wall parallel to the said inclined seed supporting walls adapted to hold the seeds in positions in the cells.

17. A seed withdrawing and delivering device for a planter, consisting of a rotatable seed plate having cells at its periphery, each having an inclined bottom and each adapted to receive a kernel while sliding radially outward thereinto on an inclined path, a stationary abutment at the lower outer edges of the said cells with which the kernels engage and along which they may be moved edgewise, a seed receptacle above the plate, a bottom cap in said receptacle having an upper surface sloping downward and outward, the radial lines of the said surface approximately coinciding with the radial lines of the cell bottom, and means above the cells to prevent more than a single kernel entering each, said parts being arranged substantially as described whereby the kernels are caused under the action of gravity and the pressure of the superincumbent mass to slide into the cells on outward and downward inclined lines and at the end of their outward travel are held until delivery on the inclined cell bottom.

In testimony whereof I affix my signature, in presence of two witnesses.

HARRY L. DOOLEY.

Witnesses:
ANNA KNUDSEN,
THEODORE M. HANDUL.

Copies of this patent may be obtained for five cents each, by addressing the "Commissioner of Patents, Washington, D. C."